United States Patent Office

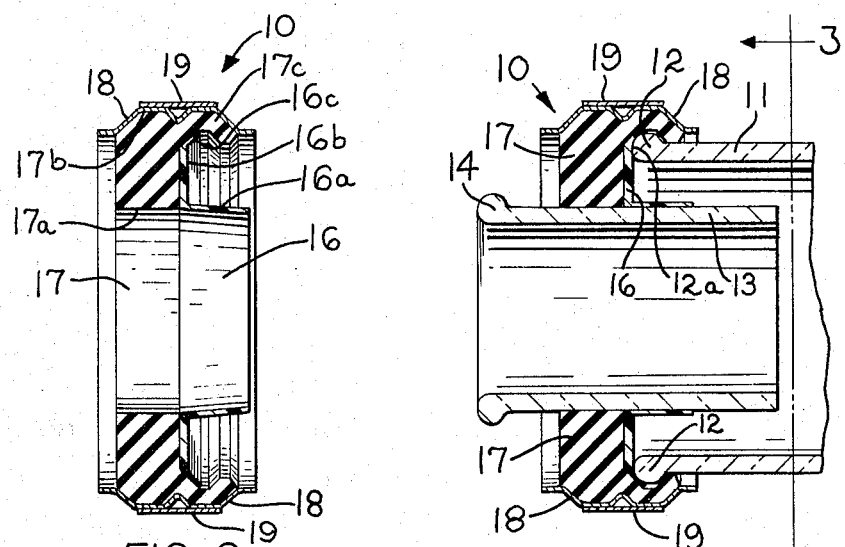
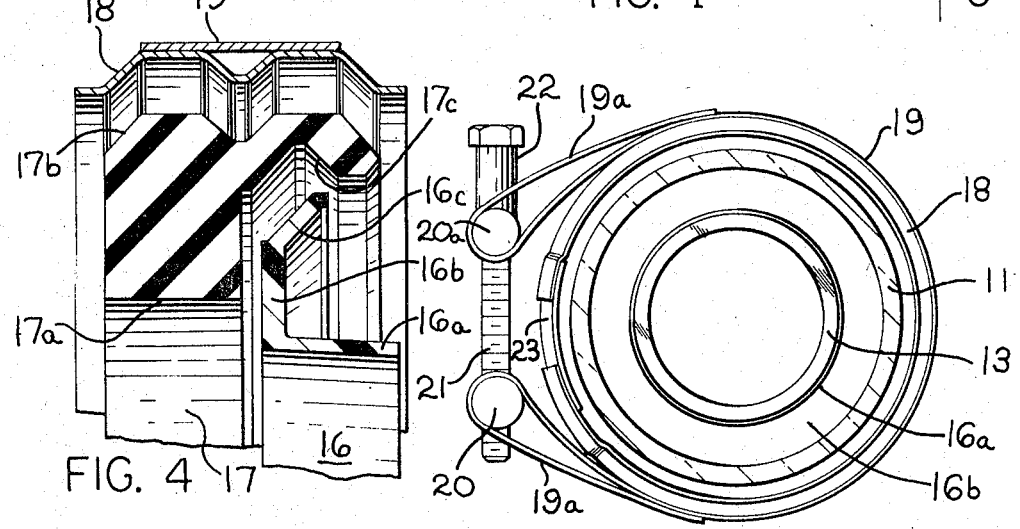
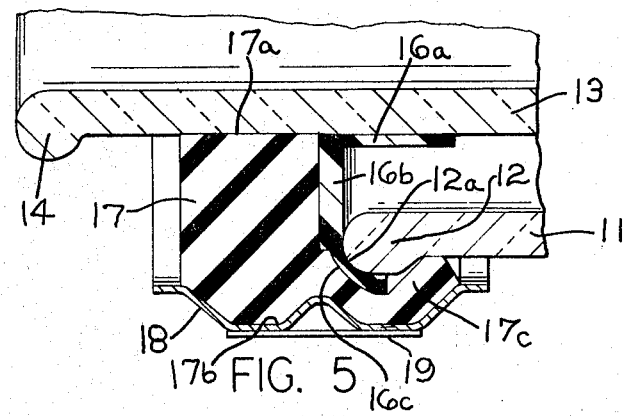

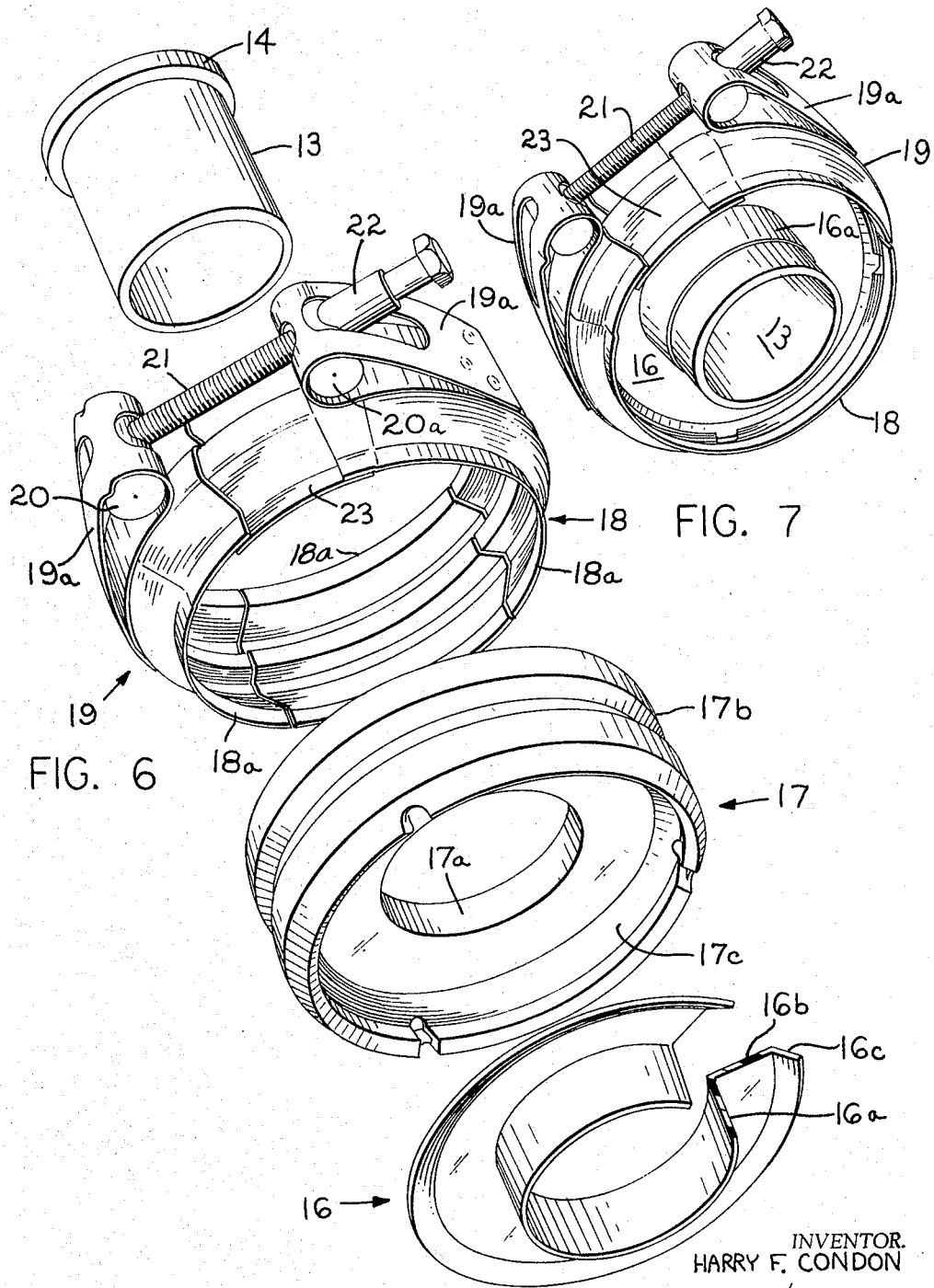

3,298,698
Patented Jan. 17, 1967

3,298,698
PIPE COUPLING FOR JOINING PIPE SECTIONS
OF VARYING SIZE
Harry F. Condon, Sylvania, Ohio, assignor to Owens-Illinois Glass Company, a corporation of Ohio
Filed Apr. 27, 1964, Ser. No. 362,615
10 Claims. (Cl. 277—101)

This invention relates to pipe couplings and particularly to a pipe coupling for use in joining two sections of glass pipe wherein the external diameter of one pipe is less than the internal diameter of the other, the end portion of the larger pipe to be coupled having an external contour which is beaded or flanged at its extremity. The subject pipe joint and coupling device is of particular utility in eliminating leakage and corrosion of conduits used to convey acids, alkalis, chemicals and other liquid or gaseous substances, especially in connecting conduits of diverse size.

Heretofore, sections of prefabricated glass pipe having outwardly flaring flanges with broad flat sealing surfaces at each end have been utilized to form pipe lines, the flared ends being connected by flanged metal collars and suitable flat annular gaskets placed intermediate the glass surfaces. The metal collars are drawn together by bolts with the intermediate gasket or gaskets exerting considerable force upon the glass flares. The sections are thus drawn together endwise with sufficient force to prevent leakage around the gaskets. Cushioning inserts are frequently employed between the metal collars and the pipe flared ends to form a rigid joint constriction, however, tightening of the bolts to connect the collars may result in unbalanced forces being applied to the flares and subsequent possible glass breakage due to unbalanced stresses.

Previous attempts to connect pipe sections of widely varying diameters have employed a pair of flanged metal plates or collars of varying diameter to surround each of several pipe sections with a series of flattened gaskets and gasket followers being employed to apply compressive force against the end portion of the larger pipe end. However, exceedingly more complex assemblies are required in order to join the pipe sections of diverse size in this manner. Further, these couplings have relied upon axially-applied forces in order to achieve sealing of an innermost L-shaped gasket. However, their sealing to the pipe of smaller diameter is not consistently effective, particularly where internal pressure must be retained. This invention is concerned with elimination of disadvantages inherent in the above-described pipe couplings and to provide a novel coupling capable of joining pipes of widely varying diameter in an improved manner.

Accordingly, it is an object of the present invention to provide a pipe coupling for connecting two sections of pipe fittings of diverse dimensions disposed in end-to-end concentric relation so that sealing forces transmitted by the coupling are applied to both the end portion of the larger pipe end and an intermediate exterior portion of the smaller pipe to provide a pressure-tight seal.

Another object of this invention is to provide a non-corrosive glass pipe joint and coupling having a simple and practical construction which is economical to manufacture and readily adaptable to mounting and dismounting as required.

Another object of this invention is to provide a pipe coupling device having a high degree of corrosion resistance which is capable of connecting glass or metal pipe sections and fittings which have exteriorly-projecting flanged end contours of varying configuration.

Another object of this invention is to provide a durable glass pipe coupling comprised of a minimum of component parts having a non-corrosive flanged internal sealing gasket comprised of chemically-resistant resilient material with sealing forces being applied both angularly and normally to the pipe axis, the joint being capable of withstanding pressurized loading for prolonged periods without breakage or corrosion.

A further object of this invention is to provide a glass pipe joint coupling comprised of two glass pipe sections of widely diverse size, the larger of which has a beaded or thickened flanged end, the coupling device adapted to seal and firmly retain the flanged end of the larger pipe and an intermediate region of the smaller pipe in telescopic pressure-tight relation.

A still further object of this invention is to provide a glass pipe joint and coupling device capable of maintaining two pipe sections of widely varying diameter in concentric pressure-tight sealed arrangement, the innermost sealing gasket being forcefully retained against the flanged end portion of the larger pipe and the exterior surface of the smaller pipe.

The specific nature of this invention, as well as other objects and advantages thereof, will become apparent to those skilled in the art from the following detailed description taken in conjunction with the annexed sheets of drawings on which, by way of preferred example only, are illustrated the preferred embodiments of this invention.

On the accompanying drawings:

FIG. 1 is an axial sectional view through two sections of glass pipe of diverse size connected by a coupling embodying the invention.

FIG. 2 is an axial sectional view of the coupling alone.

FIG. 3 is a transverse view taken along the line 3—3 of FIG. 1 showing the coupling in plan in finally sealed arrangement.

FIG. 4 is an enlarged fragmentary vertical sectional view of the components of the coupling device in exploded relation.

FIG. 5 is an enlarged fragmentary sectional view of one portion of FIG. 1.

FIG. 6 is a perspective view of the coupling and one fitting in disassembled relation.

FIG. 7 is a perspective view of the coupling and fitting in assembled relation.

Referring to the drawings in detail and particularly FIG. 1, the numeral 10 designates a glass pipe joint in finally-sealed arrangement. The numeral 11 designates one section of glass pipe having a larger diameter with a thickened flange 12 at its end portion having a cross-sectional contour of a generally right-angled bead or flange. The internal diameter of section 11 is substantially uniform throughout its length and thickened flange 12 projects exteriorly having either an essentially planar or convexly-curved terminating surface 12a.

The numeral 13 designates another section of pipe having a smaller diameter with its end telescoped into larger pipe 11 to be coupled thereto. Pipe section 13 may have a thickened flange 14 which is formed either by heating and tooling the glass or by heating alone to form an enlarged bead. Alternately, smaller pipe 13 may be comprised of glass, metal, plastic or other material having an essentially uniform external diameter. As shown in FIGS. 1, 2 and 4, a flanged tubular sealing gasket 16 having an essentially J-shaped cross-sectional contour is mounted interiorly of coupling 10 contacting and surrounding both the flange end 12 of the larger pipe and an intermediate sidewall portion of the smaller pipe. As shown in FIG. 2, the tubular portion 16a of sealing gasket 16 is tapered inwardly from its outwardly-projecting flange portion 16b toward the interior of pipe section 11. Flange portion 16b has a beveled angularly-projecting extension 16c formed thereon adapted to at least partially surrounded and contact at least one annular area of flange portion 12a of larger pipe 11. Central flanged portion 16b has a thicker cross-section than either tubular portion 16a or beveled portion 16c to prevent buckling thereof upon loading by closing the outer constricting band.

An annular compression gasket 17 surrounds the next adjacent exterior portion of smaller pipe 13 exteriorly of larger pipe 11, one half-section of its bore having an open annulus therein to retain sealing gasket 16 therewithin, the other half-section having an internal diameter 17a complemental to the external diameter of smaller pipe 13. The exterior surface 17b of compression gasket 17 has an M-shaped cross-sectional contour with a central groove in a medial region adapted to be in alignment with flange portion 16b of sealing gasket 16. Flange surfaces 16b and 16c are retained within the open annulus portion of compression gasket 17 surrounded exteriorly by gasket flange 17c.

A segmented clamping band 18 comprised of three individual arcuately-shaped rigid component parts 18a is employed to surround the M-shaped exterior surface of annular compression gasket 17. Clamping band 18 has an internal surface with an M-shaped cross-sectional configuration complemental to exterior surface 17b of the compression gasket.

An essentially uniform one-piece tension band 19 surrounds a medial region of clamping band 18 having looped end portions 19a adapted to retain a barrel nut 20 and trunnion 20a therewithin. A bolt 21 is utilized to pass through trunnion 20a to connect to threaded barrel nut 20 to draw looped ends 19a toward one another to tighten the coupling and compress gaskets 17 and 16 against the pipe surfaces. Obviously, other types of retaining mechanisms such as a latch-type connecting device can be utilized to restrain the ends of tension band 19 to constrict arcuate segments 18a together. A sleeve members 22 is used to separate the bolt head and the trunnion 20a.

A telescoping guide member 23 is attached within an end of one component part 18a beneath one looped end 19a pointing toward the juxtaposed end of the next adjacent similar part. Both are recessed slightly to receive the guide member to provide band 18 with uniformly cylindrical internal surfaces. Guide 23 is located circumferentially in alignment with and between the looped ends of exterior band 19 to facilitate applying and removing the coupling device and to provide uniform 360° loading on the annular sealing gaskets disposed therebeneath.

Annular compression gasket 17 is preferably comprised of elastomeric material such as synthetic rubber having a Shore Durometer Hardness, Type A Scale, ranging from about 50 to 100. Gasket 17 which has an M-shaped external contour complemental to segmented clamping member 18 has a laterally extending flange 17c on one side which is adapted to engage the shoulder surface of beaded end 12a.

Sealing gasket 16 is preferably comprised of chemically-resistant resilient material such as polytetrahaloethylene resin. Sealing gasket 16 preferably has an internal taper ranging from about 2 to 5 degrees with respect to its axis. The beveled portion 16c preferably forms an angle of about 45 degrees with its axis. Member 16 is preferably comprised of polymerized fluorinated ethylene-propylene synthetic resin sold under the tradename "Teflon," "FEP" or "TFE" fluorocarbon resins. This member may also be comprised of polytrifluorochloroethylene, sold under the tradename "KEL–F," or other chemically-resistant materials.

As shown in FIG. 4, sealing gasket 16 nests within compression gasket 17, the latter having an essentially uniform bore 17a, while the former has a tapered bore in the direction toward the interior of the larger pipe. Sealing gasket 16 is preferably one which is chemically inert and resistant to the action of corrosive chemicals such as acids and alkalis. The fluorocarbon resins referred to as "Teflon" have general properties of only slight resilient deformability and yield only slightly under compressive force, these materials being capable of returning to their original shape when the compressive force is removed. Such resins are chemically stable to temperatures of about 550° F. and physically stable up to about 300° F.

It has been found that the tapered character of the tubular portion of gasket 16 permits ready insertion and It has been found that the tapered character of the coupling. The degree of taper is arranged to accept and seal to all dimensional variations of a prescribed size pipe or fitting. The inward compressive force applied by clamping bands 18 and 19 is directed radially inwardly through sealing gasket central flange 16b to seal tapered tubular portion 16a against the smaller pipe. The notched central region of clamping band 18 and gasket 17 serves to force beveled flange 16c angularly against an annular region of flange 12 of the larger pipe disposed at an angle of about 45 degrees to the joint axis.

The sealing gasket is caused to flow inwardly toward the smaller pipe to exert considerable sealing and gripping force uniformly therearound as clamping bands 18 and 19 are constricted. The tapered tubular wall portion of the sealing gasket frictionally engages in sealed relation the surrounded wall portion of the smaller pipe. An annular corner region of flange surface 12a is forcefully contacted by the beveled portion 16c of the sealing gasket to form a pressure-tight seal therearound. The sealed joint is fully capable of retaining 15 to 30 p.s.i. internal pressure. The joint is capable of being sealed with some slight degree of axial misalignment of the two pipes, however, coaxial alignment of the pipes provides improved results. The beveled gasket flange frictionally engages an annular region of the pipe end flange at about 45 degrees from axial to conform thereto as shown in FIGS. 1 and 5 to exert considerable sealing and gripping force.

Various modifications may be resorted to within the scope and spirit of the appended claims.

I claim:

1. A coupling device adapted to connect two pipes of diverse size, the smaller being telescoped into the larger, said device comprising a sealing gasket of J-shaped cross-sectional configuration with a central flange portion extending in an outward direction perpendicular with respect to the longitudinal axis of the coupling device and terminating with a beveled end portion that extends in the radial direction and in the axial direction said end portion abutting and extending toward and radially beyond the end of said larger pipe, a tapered tubular portion attached to the radially extending flange portion with the end thereof terminating within the cavity formed by said larger pipe, an annular compression gasket of M-shaped cross-sectional configuration adapted to retain said sealing gasket within a half-section of its bore so that the central flange portion of said sealing gasket is in approximate radial alignment with the center of said compression gasket, the other half-section of said compression gasket extending radially inward so that it closely surrounds the smaller pipe, and means for joining said pipes in telescoped sealed relation including a tubular clamp the inside surface being complemental to the exterior of said compression gasket so that when a constricting force is applied to the exterior of said compression gasket the resulting radially inward force of the depressed control portion of the compression gasket will urge the radially extending portion of said sealing gasket into a sealing relationship with the exterior of said smaller pipe and the end of said larger pipe.

2. A coupling device in accordance with claim 1,
   said J-shaped flanged tubular sealing gasket being comprised of polytetrahaloethylene resin.

3. A coupling device in accordance with claim 1, said annular compression gasket being comprised of elastomeric rubber material having a Shore Durometer Hardness, Type A Scale, ranging from about 50 to 100.

4. A coupling device in accordance with claim 1, said tubular clamp being comprised of three equiangular arcuate rigid metallic sections, a clamping band exteriorly surrounding said three metallic sections, and a nut-and-bolt assembly connecting the ends of said clamping band.

5. A coupling device in accordance with claim 1, the medial region of said M-shaped interior and exterior surfaces of said tubular clamp and said compression gasket respectively, and the central flange portion of said sealing gasket intermediate its tapered and beveled portions being disposed substantially in alignment normal to the coupling axis.

6. A coupling for connecting two pipes of widely-differing diameter in telescoped sealed relation, said coupling comprising a flanged tubular sealing gasket having a J-shaped cross-section with its tubular portion ending in the same direction as the telescoped end of the smaller pipe and being tapered to closely surround the smaller pipe and its radially extending flange portion being beveled to closely surround the end portion of the larger pipe, an annular compression gasket of resilient material adapted to retain said flanged tubular sealing gasket within a half-section of its bore, the other half-section closely surrounding the smaller pipe, said compression gasket having an M-shaped exterior surface in section, and a tubular clamp joining said pipes in telescoped sealed relation having an M-shaped interior surface in section complemental to the exterior surface of said compression gasket.

7. A coupling in accordance with claim 6, the tapered portion of said flanged tubular sealing gasket forming an angle ranging from about 2 to 5 degrees and the beveled portion an angle of about 45 degrees both with respect to the gasket axis.

8. A coupling in accordance with claim 6, said J-shaped flanged tubular sealing gasket being comprised of polytetrafluoroethylene resin, its flanged portion extending outwardly and its tapered tubular portion extending inwardly toward the smaller pipe, and said annular compression gasket is comprised of elastomeric rubber material having a Shore Durometer Hardness, Type A Scale, ranging from about 50 to 100.

9. A coupling in accordance with claim 6, said annular compression gasket of resilient material having an open annulus in one half-section adapted to retain said J-shaped flanged tubular sealing gasket, its other half-section and the tapered portion of said sealing gasket having an internal diameter closely complemental to the smaller pipe.

10. A coupling in accordance with claim 6, said tubular clamp being comprised of three arcuately-shaped equi-angular rigid metallic sections, a flexible clamping band exteriorly surrounding said three metallic sections, and a nut-and-bolt assembly connecting the ends of said clamping band for maintaining the same in tension.

References Cited by the Examiner

UNITED STATES PATENTS

| 2,087,185 | 7/1937 | Dillon | 285—111 |
| 2,415,339 | 2/1947 | Curtis | 285—177 X |
| 3,233,907 | 2/1966 | Stanton | 285—177 X |
| 3,235,293 | 2/1966 | Condon | 285—367 X |

FOREIGN PATENTS 16,323   12/1884   Great Britain.

CARL W. TOMLIN, *Primary Examiner.*

THOMAS F. CALLAGHAN, *Examiner.*